(12) United States Patent
Skinner

(10) Patent No.: US 9,739,410 B2
(45) Date of Patent: Aug. 22, 2017

(54) CLAMP FOR REPAIR OF PIPE COUPLINGS

(71) Applicant: Cox Engineering Company, Canton, MA (US)

(72) Inventor: Stephen J. Skinner, Norwell, MA (US)

(73) Assignee: Cox Engineering Company, Canton, MA (US)

( * ) Notice: Subject to any disclaimer, the term of this patent is extended or adjusted under 35 U.S.C. 154(b) by 0 days.

(21) Appl. No.: 14/795,381

(22) Filed: Jul. 9, 2015

(65) Prior Publication Data

US 2016/0010782 A1    Jan. 14, 2016

Related U.S. Application Data

(60) Provisional application No. 62/023,379, filed on Jul. 11, 2014.

(51) Int. Cl.
*F16L 55/18* (2006.01)
*F16L 55/172* (2006.01)
*F16L 55/175* (2006.01)

(52) U.S. Cl.
CPC ............. *F16L 55/18* (2013.01); *F16L 55/172* (2013.01); *F16L 55/175* (2013.01)

(58) Field of Classification Search
CPC ......... F16L 55/18; F16L 55/17; F16L 55/172; F16L 55/178; F16L 55/175; F16L 55/168; F16L 21/04; F16L 21/08; F16L 21/065; F16L 41/12; F16L 41/00; F16L 41/06; F16L 47/30; F16L 47/12; F16L 23/003; F16L 23/02; F16L 17/025; F16L 17/04
See application file for complete search history.

(56) References Cited

U.S. PATENT DOCUMENTS

| | | |
|---|---|---|
| 1,915,924 A | 2/1932 | Coe |
| 2,697,274 A | 5/1950 | Merrill |
| 3,472,537 A | 10/1969 | Paterson |
| 3,565,468 A | 2/1971 | Garrett |

(Continued)

FOREIGN PATENT DOCUMENTS

| | | |
|---|---|---|
| CN | 203363530 | 12/2013 |
| GB | 2296305 | 6/1996 |

OTHER PUBLICATIONS

Tinker, G. In the Groove: Common Myths about Mechanical Pipe Joints. http://www.plantservices.com/articles/2010/04mechanicalpipejoints/?start=0. [Online] 2010.

(Continued)

*Primary Examiner* — Monica Carter
*Assistant Examiner* — Seahee Yoon
(74) *Attorney, Agent, or Firm* — Onello & Mello, LLP.

(57) ABSTRACT

A clamp for repair of a pipe coupling, includes a clamp unit including a side wall with an inner surface, the inner surface having a curvature dimensioned to match an outer curvature of a pipe coupling to be repaired. A coupling on the clamp unit is constructed and arranged to couple a first portion of the clamp unit with a second portion of the clamp unit. The coupling, when secured, operates to induce a radially inward force on the inner surface of the clamp unit. A window is formed as an opening in the side wall of the clamp unit. The window is dimensioned to expose a flange of a pipe coupling to be repaired.

25 Claims, 12 Drawing Sheets

(56) References Cited

U.S. PATENT DOCUMENTS

| | | | |
|---|---|---|---|
| 3,944,260 A | 3/1976 | Petroczky | |
| 4,091,694 A | 5/1978 | Parrish | |
| 4,155,574 A | 5/1979 | Hulsey | |
| 4,258,941 A * | 3/1981 | Sands | F16L 41/12 137/318 |
| 4,365,393 A | 12/1982 | Hauffe et al. | |
| 4,568,091 A * | 2/1986 | Harrison | F16L 23/167 277/616 |
| 4,653,782 A * | 3/1987 | Munday | F16L 55/172 285/15 |
| 5,870,804 A * | 2/1999 | Wylin | B25B 5/101 24/279 |
| 6,305,719 B1 * | 10/2001 | Smith, Jr. | F16L 55/172 138/99 |
| 6,467,811 B2 | 10/2002 | Mitchell | |
| 7,219,934 B2 * | 5/2007 | McMahon | F16L 21/08 285/367 |
| 7,384,076 B2 * | 6/2008 | Bradley | F16L 21/08 285/104 |
| 7,490,871 B2 * | 2/2009 | Avram | F16L 21/065 285/373 |
| 7,871,111 B2 | 1/2011 | Jensen | |
| 8,701,258 B2 * | 4/2014 | Koepke | B23K 37/0435 29/402.09 |
| 2002/0021004 A1 * | 2/2002 | Mitchell | F16L 23/003 285/15 |
| 2010/0171300 A1 | 7/2010 | Sudar | |
| 2012/0005866 A1 | 1/2012 | Ireland et al. | |
| 2012/0274061 A1 * | 11/2012 | Wilkinson | F16L 55/172 285/238 |
| 2013/0185919 A1 * | 7/2013 | Beagen, Jr. | F16L 17/025 29/525.02 |

OTHER PUBLICATIONS

Victaulic. https://en.wikipedia.org/wiki/Victaulic. [Online].

Su P, and Fuller DB. Corrosion and Corrosion Mitigation in Fire Protection Systems. . Norwood MA : FM Global, Jul. 2014 (Second Edition).

Soroushian, S., Zaghi, A., Maragakis, E., Echevarria, A., Tian, Y., and Filiatrault, A.. Seismic Fragility Study of Fire Sprinkler Piping Systems with Grooved Fit Joints. J. Struct. Eng. 2014, 10.1061/ (ASCE)ST.1943-541X.0001122, 04014157.

Corview.com . 21 Types of Pipe Corrosion & Failure. https://www.corrosionpedia.com/2/1484/corrosion/type-of-corrosion/a-look-at-different-types-of-pipe-corrosion. [Online] 2015.

* cited by examiner

CLAMP FOR REPAIR OF PIPE COUPLINGS

RELATED APPLICATIONS

This application claims the benefit of U.S. Provisional Patent Application No. 62/023,379 filed on Jul. 11, 2014, the content of which is incorporated herein by reference in its entirety.

TECHNICAL FIELD

The present inventive concepts generally relate to a clamp and method for repairing a pipe coupling.

BACKGROUND

Pipes for fluid systems have remained largely the same for many years. Such systems can include chill water systems, hot water systems, condenser water systems, sprinkler systems, fluid chemical systems, and related systems having one or more pipes configured to receive and deliver fluid under pressure. In such systems, steel pipes or related fittings, join end-to-end at a grooved coupling. Such couplings 100, an example shown in FIG. 1, commonly include first and second housings 104A, 104B and a gasket 105. The housings 104A, 104B can each include first and second housing flanges 107A, 107B that align with each other. Bolts 106 are placed through openings in the flanges 107A, 107E and nuts 108 secure the bolts 106 after pipe ends are properly positioned at opposite ends of the gasket 105. In doing so, the resulting force causes the gasket 105 to conformably abut the pipe about which the coupling 100 is positioned.

Over time, following installation, the integrity of the bolts 106 or nuts 108 can become compromised due to rust, for example, which may occur when the gasket 105 deteriorates or when leaks occur. This is especially true in cases where the fluids are moving, or where a temperature differential exists, which, in certain environmental conditions, can cause condensation to form. Over time, the rusted bolts 106 and/or nuts 108 must be replaced. Such replacement can be inefficient, since it requires a de-pressurization of the water system. With de-pressurization of a water-based fire sprinkler system, for example, the associated building must remain vacant, due to fire safety concerns. This is a major inconvenience for building owners and tenants alike.

SUMMARY

In some aspects of the present inventive concepts, systems and methods are provided to achieve bolt and/or nut replacement of the couplings while the water system, or other fluid system, is pressurized or "live", so that water may flow through the pipes at near or normal pressures during the bolt and/or nut replacement. A clamp is provided that provides a secondary mechanism for maintaining the position of the first and second housings of a pipe coupling during replacement of the coupling bolts/nuts. The repair process can be performed without the inconvenience of de-pressurization of the system, leading to inherent efficiencies.

In one aspect, provided is a clamp for repairing a pipe coupling between pipe sections comprises a first clamp unit and a second clamp. The first end of the first clamp comprises a first flange hole extending through a first flange. A second end of the first clamp comprises a second flange hole extending through a second flange. A first body portion extends between the first end and the second end. A first window in the first body portion exposes a first flange of the pipe coupling. The second clamp unit is removably coupled to the first clamp unit, and comprises a first end and a second end. The first end of the second clamp unit comprises a third flange hole extending through a third flange. The second end of the second clamp unit comprises a fourth flange hole extending through a fourth flange. A second body portion extends between the first end and the second end. A second window in the second body portion exposes a second flange of the pipe coupling. A coupling extends through at least one of the aligned first and third flange holes or the aligned second and fourth flange holes.

In some embodiments, the coupling includes a bolt that extends through the at least one of the aligned first and third flange holes or the aligned second and fourth flange holes and a threaded nut in communication with the bolt.

In some embodiments, a force created by the threaded nut about the bolt causes the first ends of the first and second clamp units, respectively, to move axially toward each other, which in turn causes the first and second clamp units to tighten around the pipe coupling.

In some embodiments, the body portion of each of the first and second clamp units has an arc shape so that a combination of the first and second clamp units coupled to each other is ring shaped.

In some embodiments, the first and second clamp units apply a force directly on the pipe coupling that counteracts a force caused by fluid pressure at the pipe sections.

In some embodiments, the first and second clamp unit flanges at the first ends of the first and second clamp units are coupled together at a first position of the clamp, the first and second clamp unit flanges at the second ends of the first and second clamp units are coupled together at a second position of the clamp opposite the first position, and the first window of the first clamp unit is at a third position between the first and second positions, and the second window of the second clamp unit is at a fourth position opposite the third position, and between the first and second positions.

In some embodiments, the flanges are oriented normal to a curvature of the first and second clamp units, respectively, so as to face each other.

In some embodiments, fluid in the underlying pipe is under pressure.

In some embodiments, at least one of the first or second clamp units includes an indentation about at least one of the first or second window.

In another aspect, provided is a clamp for repairing a pipe coupling between a first pipe section and a second pipe section through which fluid flows during the repair. The clamp comprises a first plate for positioning on one side of the pipe coupling and the first and second pipe sections; a second plate separate from the first plate and for positioning on an opposite side of the pipe coupling and the first and second pipe sections as the first plate and the first and second pipe sections, respectively; a first coupler holder extending from the first plate in a direction toward the second plate and abutting each of the first and second pipe sections; a second coupler holder extending from a surface of the second plate in a direction toward the first plate, and abutting each of the first and second pipe sections; and at least four bolts extending between the first and second plates in a direction of extension that is perpendicular to the direction of the extension of the first and second pipe sections.

In some embodiments, the first and second coupler holders are each constructed and arranged for conforming with a surface of the first and second pipe sections.

In some embodiments, a bolt of the at least four bolts extends through holes in the first plate and holes in the second plate aligned with the holes in the first plate, and the clamp further includes a threaded nut for each bolt, wherein bolts and nuts provide a force that moves the first and second plates toward each other and toward the pipe coupling so that the first plate directly abuts, and applies a force to, the first side of the pipe coupling and so that the second plate directly abuts, and applies a force to, the second of the pipe coupling.

In some embodiments, a force created by the threaded nut about the bolt causes the first and second plates to tighten around the pipe coupling and for the first and second coupler holders to tighten about the first and second pipe sections.

In some embodiments, the first and second plates apply a force directly on the pipe coupling that counteracts a force caused by fluid pressure at the first and second pipe sections.

In another aspect, provided is a method for repairing a pipe coupling between a first pipe section and a second pipe section, comprising positioning a first clamp unit on one side of the pipe coupling. The first clamp unit comprises a first end and a second end. The first end comprises a first flange and a first flange hole extending through the first flange. The second end comprises a second flange and a second flange hole extending through the second flange. The first clamp unit further comprises a first body portion extending between the first end and the second end and a first window in the first body portion for exposing a first flange of the pipe coupling. The method further comprises positioning a second clamp unit on an opposite side of the pipe coupling. The second clamp unit comprises a first end and a second end. The first end comprises a third flange and a third flange hole extending through the third flange The second end comprises a fourth flange and a fourth flange hole extending through the fourth flange, and aligned with the second flange hole of the first clamp unit. The second clamp unit further comprises a second body portion extending between the first end and the second end and a second window in the second body portion for exposing a second flange of the pipe coupling. The method further comprises aligning the first flange hole of the first clamp unit and the third flange hole of the second clamp unit; aligning the second flange hole of the first clamp unit and the fourth flange hole of the second clamp unit; and extending a coupling through at least one of the aligned first and third flange holes or the aligned second and fourth flange holes such that the first and second clamp units tighten around the pipe coupling.

In some embodiments, the coupling includes a bolt that extends through the at least one of the aligned first and third flange holes or the aligned second and fourth flange holes and a threaded nut in communication with the bolt.

In some embodiments, the first and second clamp units apply a force directly on the pipe coupling that counteracts a force caused by fluid pressure at the pipe sections.

In some embodiments, the first and second clamp unit flanges at the first ends of the first and second clamp units are coupled together at a first position of the clamp, the first and second clamp unit flanges at the second ends of the first and second clamp units are coupled together at a second position of the clamp opposite the first position, and the first window of the first clamp unit is at a third position between the first and second positions, and the second window of the second clamp unit is at a fourth position opposite the third position, and between the first and second positions.

In some embodiments, the flanges are oriented normal to a curvature of the first and second clamp units, respectively, so as to face each other.

In some embodiments, at least one of the first or second clamp units includes an indentation about at least one of the first or second window. In another aspect, a clamp for repair of a pipe coupling, comprises: a clamp unit including a side wall with an inner surface, the inner surface having a curvature dimensioned to match an outer curvature of a pipe coupling to be repaired; a coupling on the clamp unit constructed and arranged to couple a first portion of the clamp unit with a second portion of the clamp unit wherein the coupling, when secured, operates to induce a radially inward force on the inner surface of the clamp unit; and a window comprising an opening in the side wall of the clamp unit, the window dimensioned to expose a flange of a pipe coupling to be repaired.

In some embodiments, portions of the inner surface of the side wall are substantially cylindrical.

In some embodiments, the coupling comprises at least one flange outwardly extending from the cylindrical sidewall in a direction normal to the inner surface.

In some embodiments, the at least one flange comprises an opening constructed and arranged to receive a bolt and wherein the coupling comprises a mating nut and bolt.

In some embodiments, the bolt, when coupling the clamp unit is positioned in a direction tangential to the cylindrical sidewall and perpendicular to, and offset from, a center axis of the cylindrical sidewall.

In some embodiments, the at least one flange comprises first and second opposed flanges and wherein the clamp unit comprises first and second sidewall portions.

In some embodiments, a radius of curvature of the portions of the inner surface of the sidewall are a same as that of the inner surface of the window.

In some embodiments, a radius of curvature of the portions of the inner surface of the sidewall are different that of the inner surface of the window.

In some embodiments, the inner surface of the sidewall in a region of the window is flat.

In some embodiments, the inner surface of the sidewall in a region of the window is indented.

In some embodiments, the radially inward force induced by the coupling is sufficient to secure a pipe coupling to be repaired during its repair.

In another aspect, a method for repair of a pipe coupling, comprises: mounting a clamp unit about a pipe coupling for repair attached to a system that is pressurized, the clamp unit including a side wall with an inner surface, the inner surface having a curvature dimensioned to match an outer curvature of the pipe coupling to be repaired; coupling the clamp unit so that when secured, the clamp unit operates to induce a radially inward force on the inner surface of the pipe coupling to be repaired; the clamp unit including a window comprising an opening in the side wall of the clamp unit, the window dimensioned to expose a flange of a pipe coupling to be repaired; repairing the pipe coupling to be repaired while the system is pressurized; and uncoupling and removing the clamp unit from the pipe coupling while the system is pressurized.

In some embodiments, coupling the clamp unit comprises coupling the clamp unit to couple a first portion of the clamp unit with a second portion of the clamp unit.

In some embodiments, repairing the pipe coupling to be repaired comprises cutting and replacing a bolt passing through the flange of the pipe coupling to be repaired exposed by the window while the system is pressurized.

In some embodiments, portions of the inner surface of the side wall are substantially cylindrical.

In some embodiments, the coupling comprises at least one flange outwardly extending from the cylindrical sidewall in a direction normal to the inner surface.

In some embodiments, the at least one flange comprises an opening constructed and arranged to receive a bolt and wherein the coupling comprises a mating nut and bolt.

In some embodiments, the bolt, when coupling the clamp unit is positioned in a direction tangential to the cylindrical sidewall and perpendicular to, and offset from, a center axis of the cylindrical sidewall.

In some embodiments, the at least one flange comprises first and second opposed flanges and wherein the clamp unit comprises first and second sidewall portions.

In some embodiments, the radially inward force induced by the coupling is sufficient to secure the pipe coupling to be repaired during its repair while the system is pressurized.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void, space, or gap.

Figure 1:
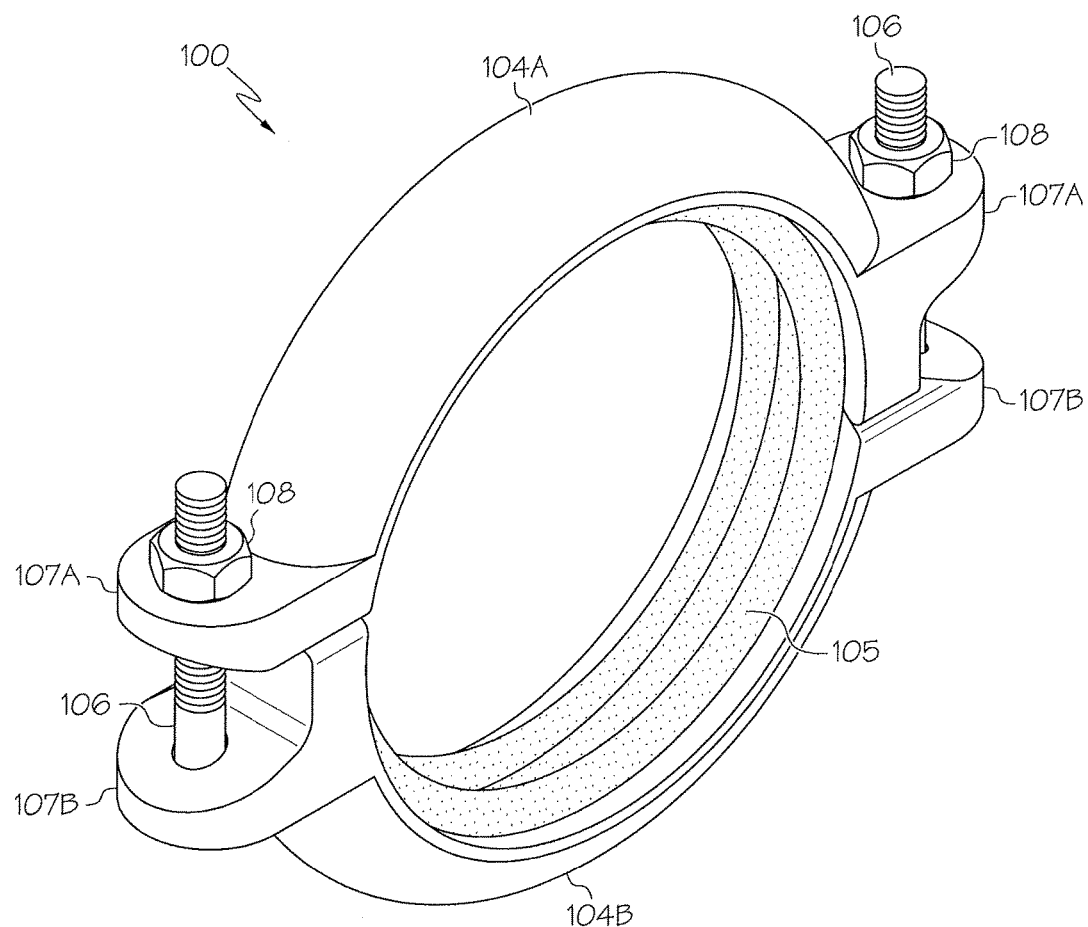
FIG. 1 is a perspective view of a conventional pipe coupling.
Figure 2:
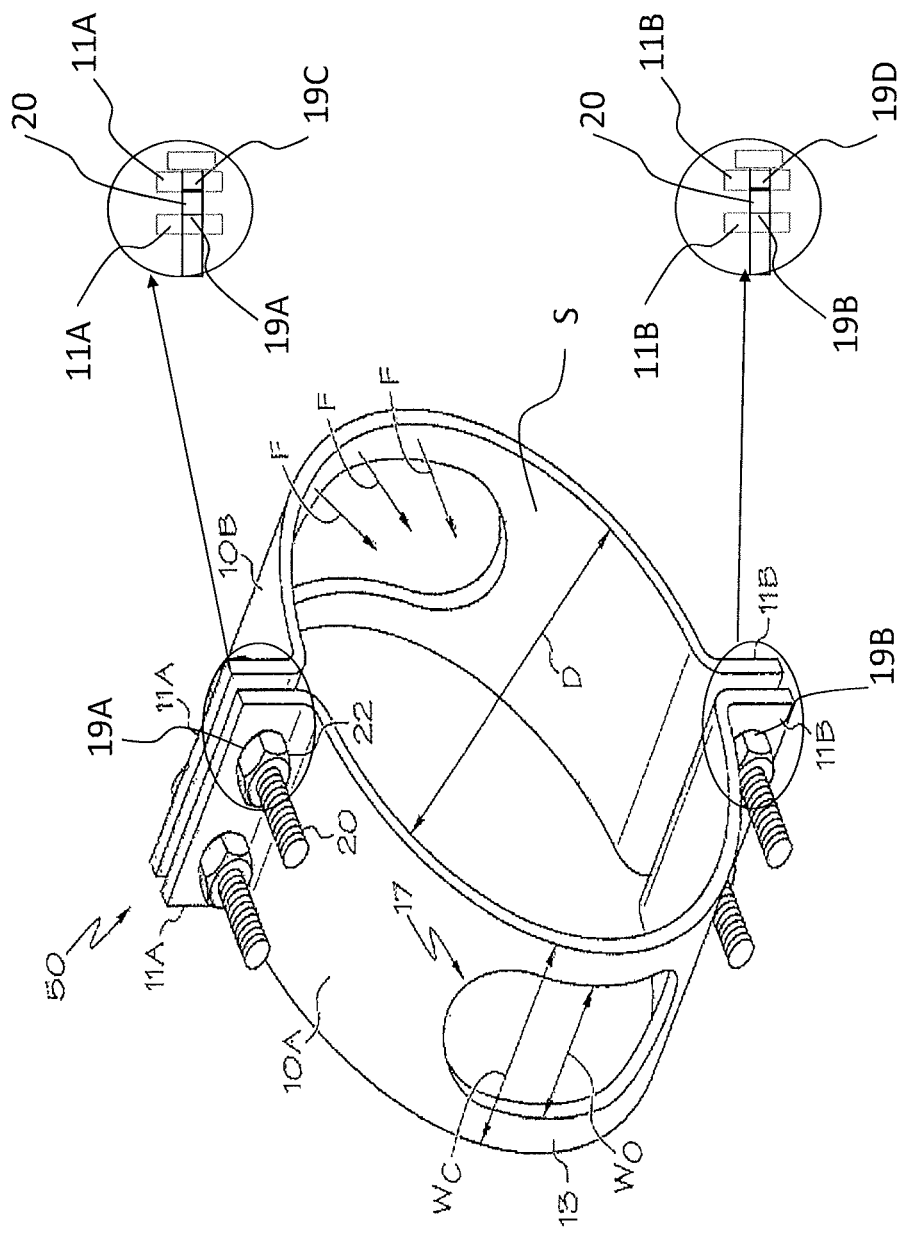
FIG. 2 is a perspective view of a clamp, in accordance with an embodiment of the present inventive concepts.
Figure 3:
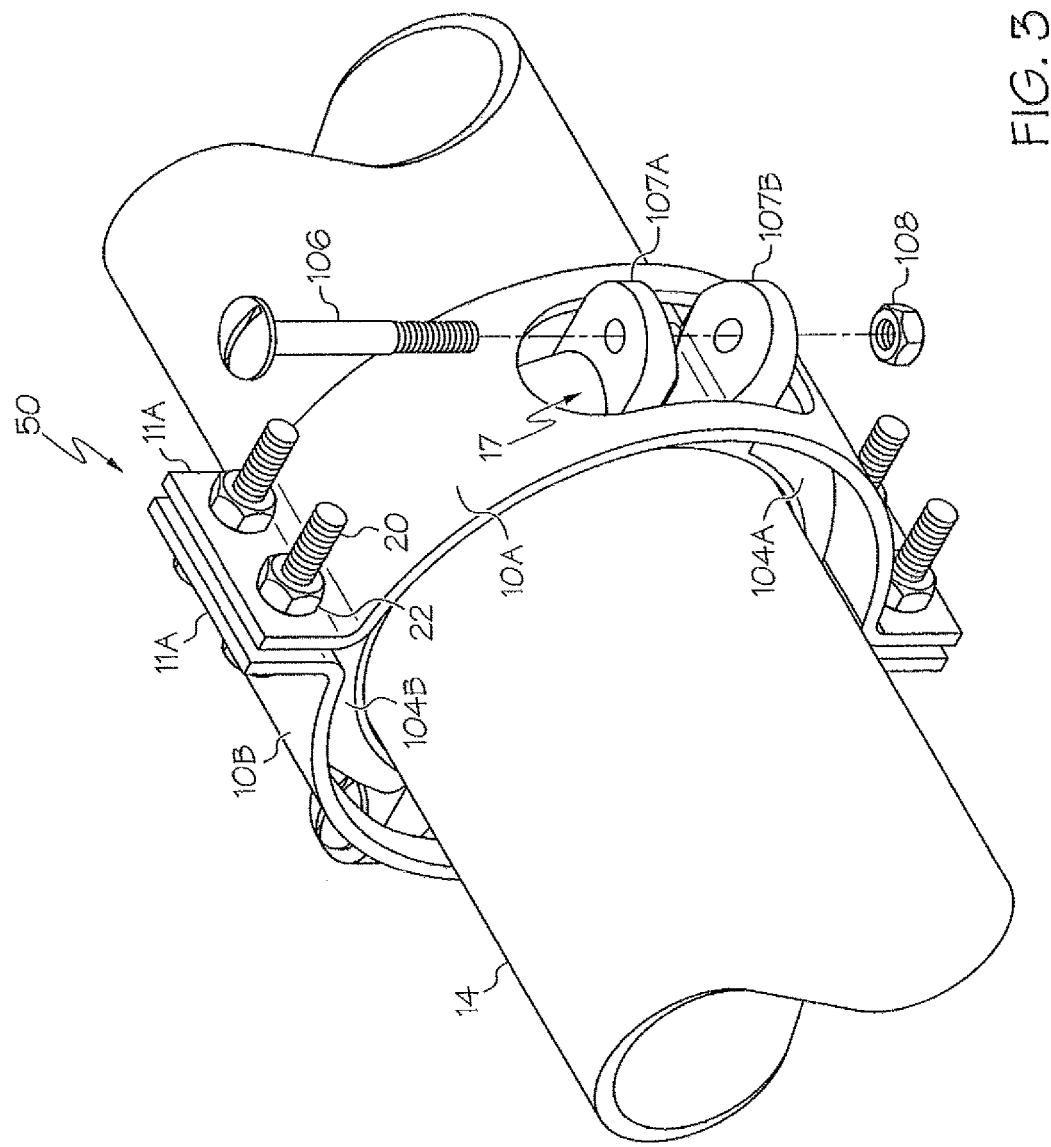
FIG. 3 is a perspective view of an assembled clamp of FIG. 2 secured to a pipe coupling, in accordance with an embodiment of the present inventive concepts.

FIG. 2 is a perspective view of a clamp 50 for repairing a pipe coupling in accordance with an embodiment of the present inventive concepts. The clamp 50 includes a first clamp unit 10A and a second clamp unit 10B. The first and second clamp units 10A, 10B are constructed and arranged to directly couple with each other for positioning about the pipe coupling, for example, pipe coupling 100 shown in FIG. 1, which in turn is secured to a pipe 14 or the like as shown in FIG. 3. In particular, each of the first and second clamp units 10A, 10B has an arc or curve shape, e.g., a semicircle shaped interior, for securing about a pipe coupling 100. In some embodiments, the interiors, or inner surface S, of the first and second clamp units 10A, 10B can be curved for positioning about a pipe coupling, and the exteriors of the first and second clamp units 10A, 10B can be of a different shape, for example, linear or curved. In some embodiments, each of the first and second clamp units 10A, 10B may be formed of metal or the like having the strength, durability, and other characteristics for securing about the pipe coupling 100. In some embodiments ¼" thick hot rolled type B67-B80 steel can be employed for the material of the pipe coupling. In other embodiments, thicker-gauge or thinner-gauge steel may be employed. In other embodiments other suitable materials may be employed, for example carbon graphite based materials or synthetic materials.

In various embodiments, the outer diameter of the couplings 100 or related dimensions can vary in size, and, therefore, so can the inner diameter (D) or related dimensions of the clamp 50. For example, the inner diameter (D) of the clamp 50 can vary in size from 1"-72". The width ($W_C$) of the clamp 50 can also vary, depending on the width of the coupling 100 and other factors.

In some embodiments, each clamp unit 10A, 10B includes a flange 11A at a first end, a flange 11B at a second end, and a body portion 13 extending between the flanged first end 11A and the flanged second end 11B. The body portion 13 is curved or otherwise contoured for positioning about one or both housings 104A, 104B of the pipe coupling 100. The body portion 13 of the first clamp unit 10A and the body portion 13 of the second clamp unit 10B can, when coupled together, each be positioned about the pipe coupling 100. In some embodiments, the flanges 11A and 11B are oriented, for example, normal, to the curvature of the body of the clamp units 10A, 10B, respectively, so as to face each other.

Each body portion 13 includes a window 17, or opening. More specifically, at each clamp unit 10A, 10B, a window 17 extends between a flange 11A at a first end and a flange 11B at an opposite second end. Referring to a clock as an analogy, when the clamp units 10A, 10B are coupled to each other, the windows 17 are at 3 o-clock and 9 o-clock positions about a periphery of each clamp unit 10A, 10B, and the flanges 11A of each clamp unit 10A, 10B abut each other at the first end at a 12 o-clock position, and the flanges 11B of each clamp unit 10A, 10B abut each other at the second end at a 6 o-clock position. Therefore, when the first and second clamp units 10A, 10B are coupled together about the pipe coupling 100, a first set of neighboring pipe coupling flanges 107A, 107B extends through a window 17 of the first clamp unit 10A (shown in FIG. 3), and a second set of neighboring pipe coupling flanges 107A, 107B opposite the first set of flanges extends through a window 17 of the second clamp unit 10B. The width Wo of the window 17 can vary, depending on the size of the clamp 100 to be repaired and the size of the flange 107 to be exposed by the window 17.

Each flange 11A, 11B of the first clamp unit 10A includes a hole 19A, 19B, 19C, 19D (generally, 19) that is aligned with a like hole 19 in a corresponding flange 11A, 11B of the second clamp unit 10B. A coupling 20 can extend through the aligned holes in the flanges 11A, 11B, respectively. In some embodiments, the coupling can be a bolt 20 and nut 22, but the types of couplings are not limited thereto. For example, a coupling device such as a ratchet, a turnscrew, and so on can equally apply so long as the coupling is constructed and arranged to apply a force to the flange 11A of the first clamp unit 10A and the flange 11A of the second clamp unit 10B through which the coupling device 20 extends so that the flanges 11A and/or flanges 11B at the opposite ends of the clamp units 10A, 10B, respectively, are forced in a direction toward each other so that the clamp 50 applies a force against the underlying pipe coupling 100 in preparation of a repair or other operation. In another example, one of the aligned flange holes, e.g., flange holes 19A and 19C in one of the flanges 11A (either clamp unit 10A or 10B) is threaded. Here, a nut 22 is not required, since the bolt 20 can extend through one of the aligned flange holes, e.g., 19A and mate with the threaded second flange hole, e.g., 19C. In another example, a nut 22 can be welded to the flange 11A, 11B so that the nut is fixedly attached to the unit 10A, 10B. The coupling 20 can include other related components such as washers or other coupling elements known to those of ordinary skill in the art. In FIG. 2, each flange 11A, 11B is illustrated as including two holes 19 for receiving two bolts 20 or related coupling device. However, a flange 11A, 11B may have a single hole, or more than two holes.

As described above, each bolt 20 can be secured by a nut 22 threaded about the bolt 20 and tightened so that the abutting clamp units 10A, 10B of the clamp 50 are pressed in a direction toward each other at the first and second ends, causing a radially inward force F to be applied to the outer surface of the coupling 100 to be repaired. In this manner, the first and second housings 104A, 104B of the coupling 100 are secured in place by the clamp 50. In doing so, the bolts 106 and nuts 108 of the coupling 100 exposed by the windows 17 in the body portions 13 of the first and second clamp units 10A, 10B can be replaced. During this procedure, the clamp 50 applies a force F to the outer surface of the coupling 100 and therefore maintains the integrity of the pressurized system, that is, even in a case where a counteracting force is caused by fluid pressure at the pipe 14. In some embodiments, further tightening of the bolts 20 of the clamp unit further increases the radially inward force F. System integrity is maintained by the clamp 50 and the thus-secured coupling 100 so that the need for the bolts 106 and nuts 108 for the coupling 100 is temporarily alleviated. A repair can be performed, for example, old bolts 106A and/or nuts 108A are removed from the coupling 100 and new bolts 106B and nuts 108B are added. Removal of the old nuts and bolts 106A, 108A can involve, when possible, simple loosening of the nuts 108A, or, where necessary, physical cutting or torch cutting of the body of the bolt 106A. The window 17 of the body portion 13 can be appropriately sized to allow for access for any suitable bolt removal procedure.

Following replacement, and proper tightening, of the replacement nuts 108B and bolts 106B, the clamp 50 can be removed. In some embodiments, the clamp can ideally be re-used multiple times for multiple bolt replacement procedures.

Figure 4:
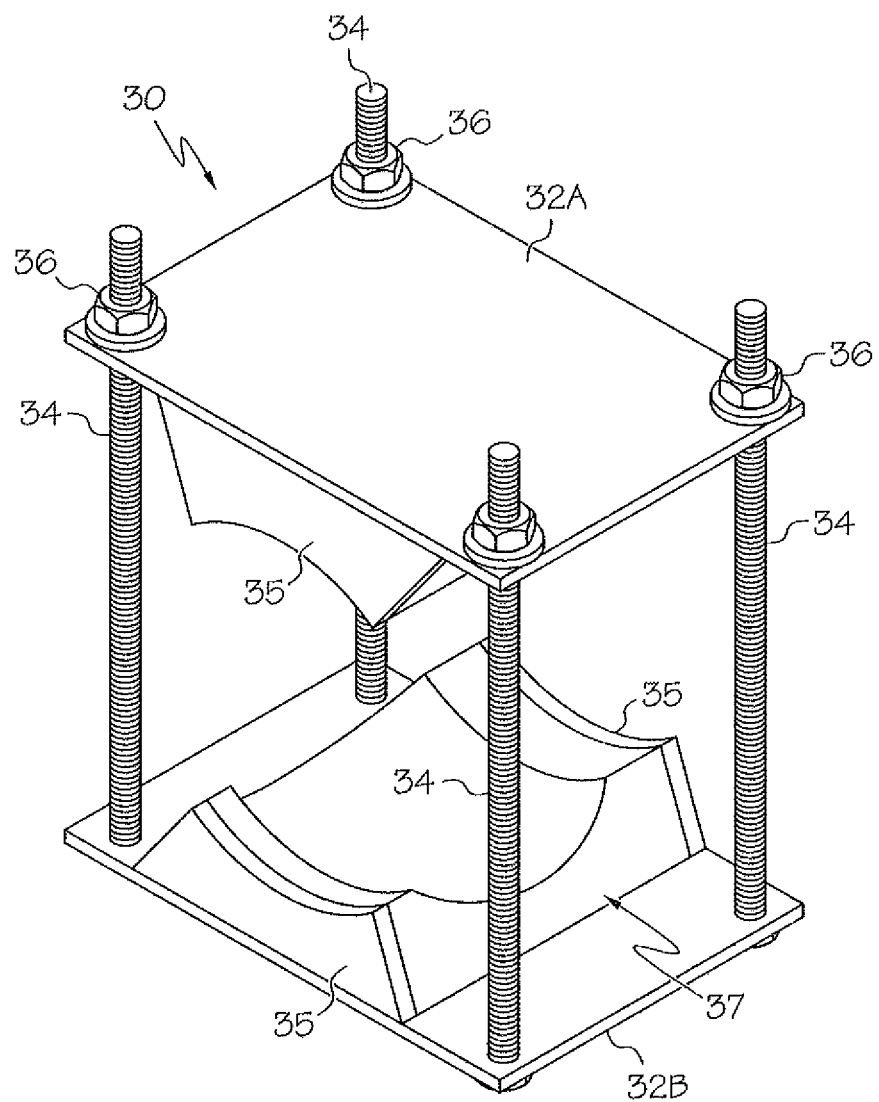
FIG. 4 is a perspective view of a clamp, in accordance with an embodiment of the present inventive concepts.

FIG. 4 is a perspective view of a clamp in accordance with another embodiment of the present inventive concepts. The clamp 30 comprises first and second plates 32A, 32B that are separated by a plurality of bolts 34 and corresponding threaded nuts 36, or related coupling devices, or other coupling devices for applying a force that directs one of the first and second plates 32A, 32B toward the other. The bolts 34 preferably extend between the plates 32A, 32B in a direction of extension that is perpendicular to the direction of extension of the pipe 14 about which the plates 32A, 32B and bolts 24 are positioned. In another example, the holes of the bottom plate 32B are threaded. Here, a nut is not required, since the bolts 34 can mate with the threaded bottom plate holes. In another embodiment, the nuts 36 can be welded or otherwise attached to the plate 32A. The plates 32A, 32B are constructed and arranged to directly abut, and apply a force against the housings 104A, 104B, respectively, of the pipe coupling 100 so that the bolts 106 and nuts 108 of the coupling 100 can be replaced even while pressurized fluid flows through the pipe 14. In some embodiments, the plates 32A, 32B can be formed of ¼" thick hot rolled type B67-B80 steel or other material suitable for sustaining the applied forces.

Figure 5:
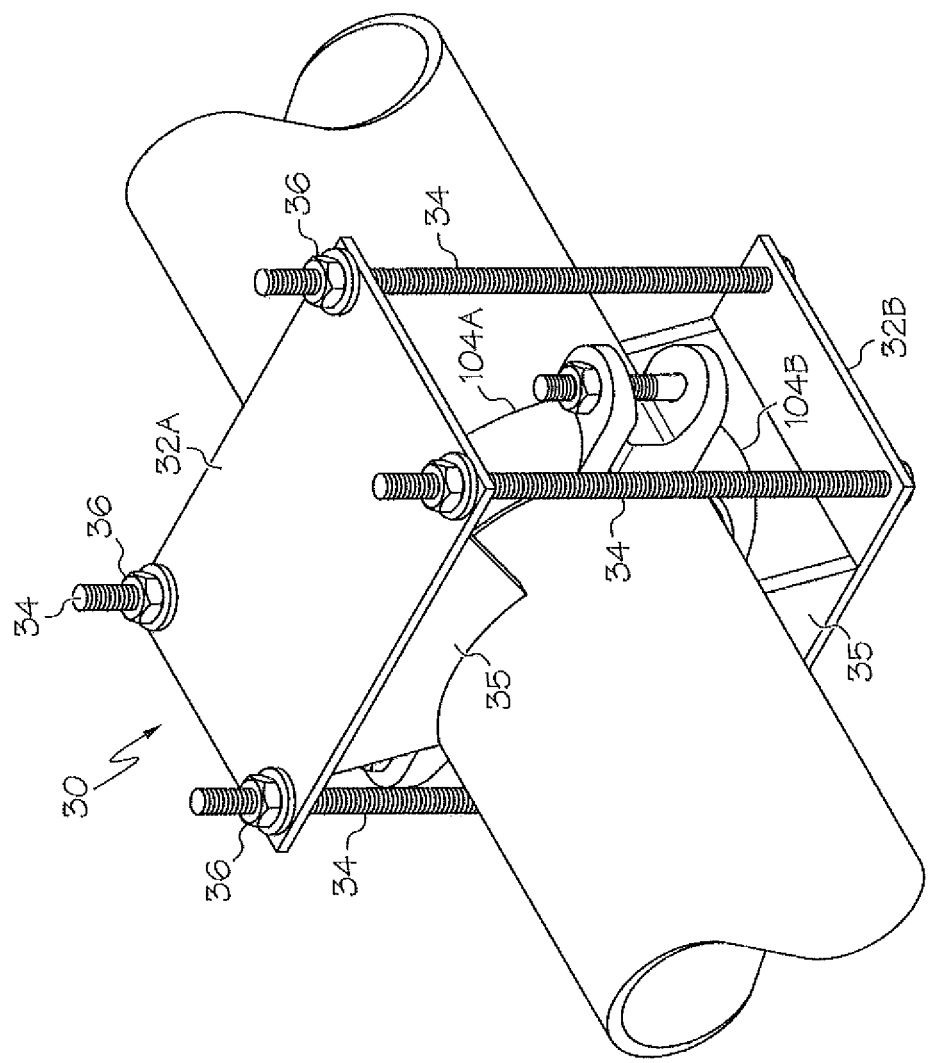
FIG. 5 is a perspective view of an assembled clamp of FIG. 4 secured to a pipe coupling, in accordance with an embodiment of the present inventive concepts.

The first and second plates 32A, 32B can have a same or similar configuration so that each is constructed and arranged for positioning about the pipe coupling 100, which in turn is secured to a pipe 14 or the like as shown in FIG. 5. In some embodiments, the first and second plates 32A, 32B each includes a clamp aligner 35 contoured that comply with an outer surface of the pipe 14 while the plates 32A, 32B apply a force directly to the coupling housings 104A, 104B, respectively, for aligning the clamp 100 with the pipe 14. The clamp aligner 35 also provides support to a coupling holder 37, which as shown in FIGS. 5-7, is constructed and arranged for positioning about, and applying a force against, the pipe coupling 100.

The clamp aligners 35 and/or coupling holders 37 can be formed of same or similar materials as the plates 32A, 32B. Alternatively, the clamp aligners 35 and/or coupling holders 37 can be formed of different materials. Four clamp aligners 35 35 can extend from the plates 32A, 32B: two clamp aligners 35 35 extending from the top plate 32A, each on either side of the first housing 104A, and two clamp aligners 35 35 extending from the bottom plate 32B, each on either side of the second housing 104B. Similarly, four clamp coupling holders 37 can extend from the plates 32A, 32B: two coupling holders 37 extending from the top plate 32A, each on either side of the first housing 104A, and two coupling holders 37 extending from the bottom plate 32B, each on either side of the second housing 104B. A coupling holder 37 is preferably perpendicular or normal to the clamp aligners 35 in order for the clamp aligners 35 to be positioned on the pipe and the coupling holders 37 to be positioned on the pipe coupling 100.

Operation of the second embodiment described with reference to FIGS. 4 and 5 is largely similar to that of the previous embodiment. Each nut 36 when threaded on a corresponding bolt 34 rotates about the helix of the bolt 34, thereby moving in a linear direction along the length of the bolt. In doing so, the first and/or second plates 32A, 32B move toward each other, with the pipe 14 and surrounding pipe coupling 100 between the plates 32A, 32B, resulting in the clamp aligners 35 positioned on the pipe 14 and coupling holders 37 positioned on the pipe coupling housings 104A, 104B, respectively.

Figure 6:
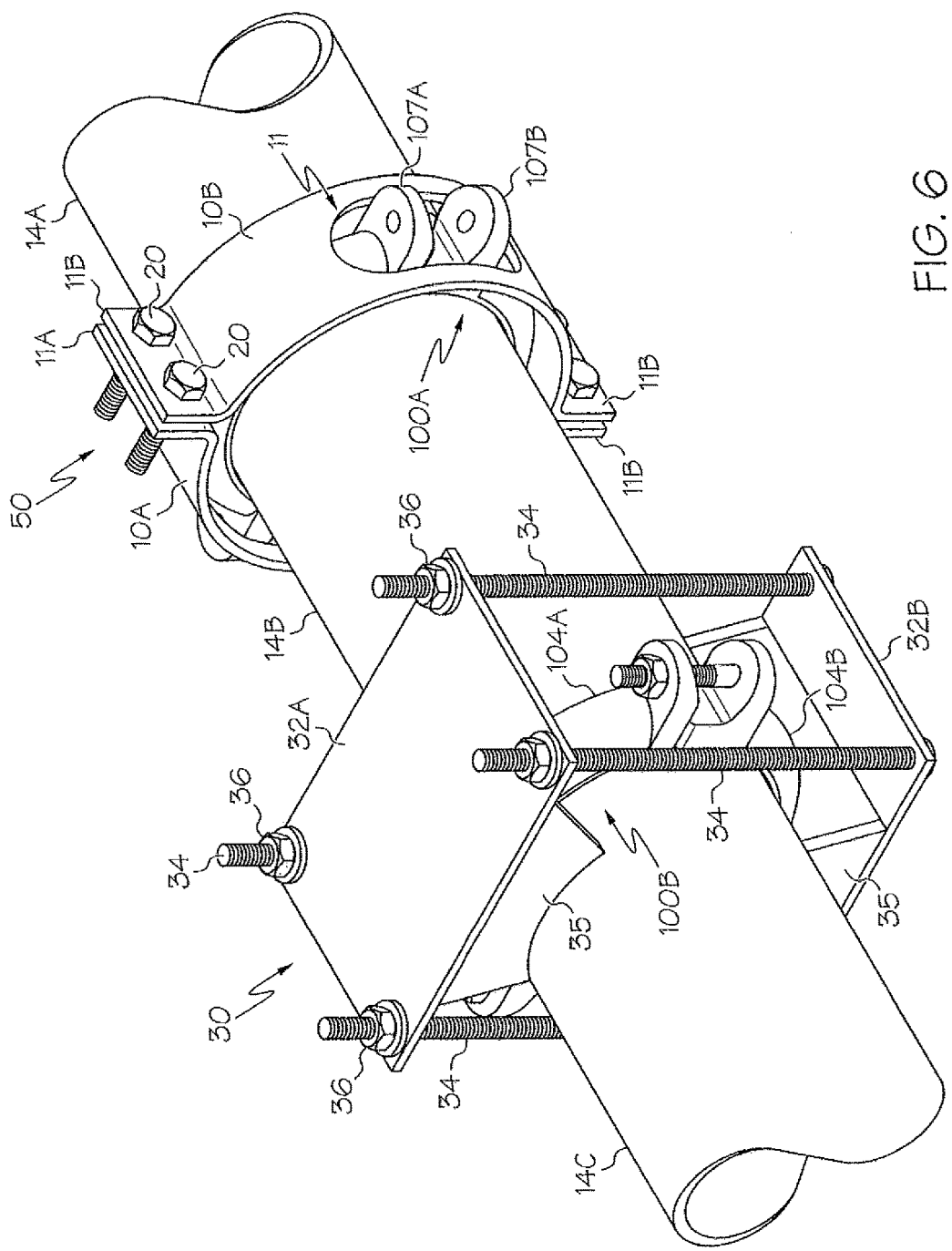
FIGS. 6 and 7 are perspective views of a system for repairing a plurality of pipe couplings, in accordance with the present inventive concepts.
Figure 7:
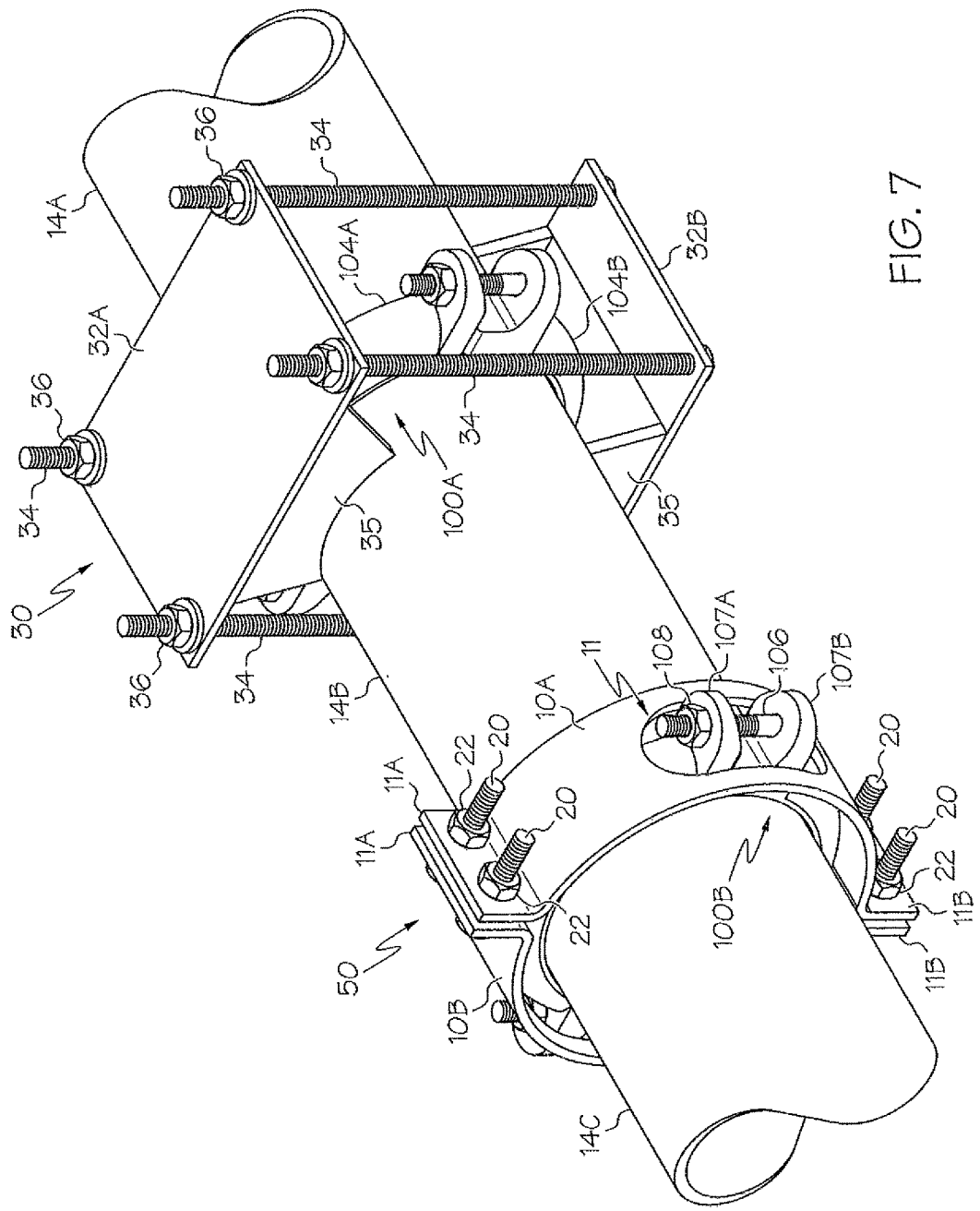

FIGS. 6 and 7 are perspective views of a system for repairing a plurality of pipe couplings, in accordance with the present inventive concepts. In particular, a first pipe coupling 100A and a second pipe coupling 100B are shown as positioned about various sections of a pipe 14A, B, C. FIGS. 6 and 7 are provided for illustrative purposes and they are meant in no way to imply that two different clamp embodiments 50, 30 are to be used on the same pipe for repairing pipe couplings.

In FIG. 6, the first clamp 50 is constructed and arranged for repairing the first pipe coupling 100A. The second clamp 30 is positioned about a second coupling 100B. In FIG. 7, the second clamp 30 is constructed and arranged for repairing the first pipe coupling 100A and the first clamp 50 is positioned about a second coupling 100B. The first clamp 50 as compared to the second clamp 30 uses a smaller footprint than the second clamp 30 allowing a user to operate in a tighter, more compact area. The first clamp 50 also encompasses a larger surface area on the pipe coupling housings 104A, B, thereby operating in environments where greater fluid pressure occurs through the pipe 14.

Figure 8:
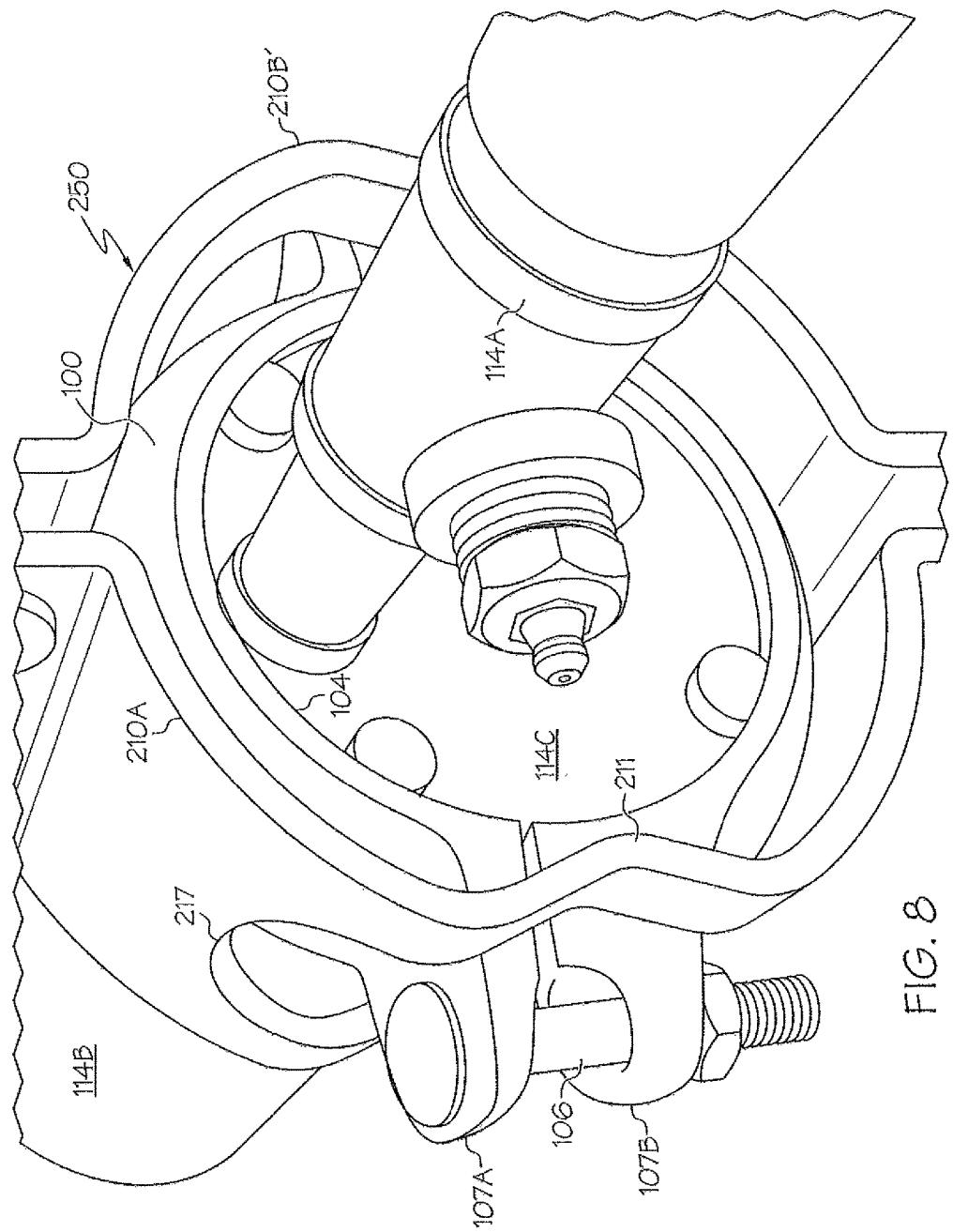
FIGS. 8 and 9 are closeup perspective views of a clamp secured to a pipe coupling, in accordance with an embodiment of the present inventive concepts.
Figure 9:
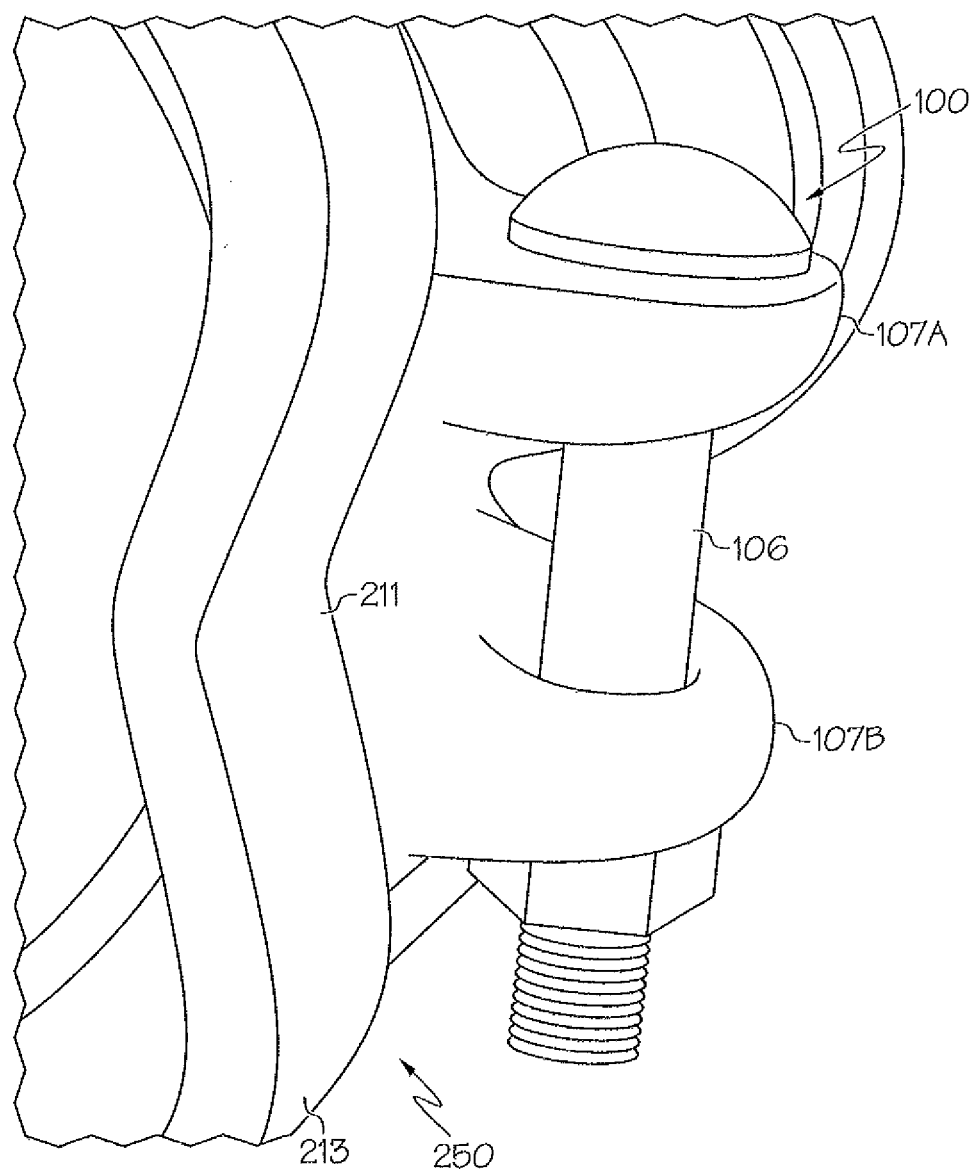

FIGS. 8 and 9 are closeup perspective views of a clamp 250 secured to a pipe coupling 100, in accordance with an embodiment of the present inventive concepts. The clamp 250 is similar to clamp 50 described with respect to FIGS. 2 and 3, except that clamp units 210A, 210B of the clamp 250 each may include an indentation, or indented body portion region 211, about a window 217. Coupling bolts 106 exposed by the windows 117 in the body portions 213 of the first and second clamp units 210A, 210B can be replaced. An indented body portion region 211 permits increased access to the bolt 106 extending through the window 217 corresponding to the indented body portion region 211, in particular, a portion of the bolt 106 between the coupling flanges 107A, 107B of the first and second pipe coupling housings 104A, B, respectively. For example, a bolt cutter, saw, grinder, or other cutting device can be given greater access to the bolt 106 for performing a cutting or related removal operation.

In particular, the indented body portion region 211 can be of a different curvature than the rest of the body portion 213. For example, assuming the body portion 213 to be of general convex curvature or configuration, the indented body portion can be considered to be of general concave curvature or configuration. While the indented body portion region 211 illustrates a mechanism for providing increased access to the bolt 106, other configurations are possible. For example, the window region 217 may optionally be configured as a region of reduced convex curvature, relative to the curvature of the body portion, configured as a region of a curvature that is the same as the curvature of the body portion, as shown in the embodiment FIG. 2, or configures as a region of indented curvature, as shown in the embodiment of FIGS. 8 and 9.

Figure 10:
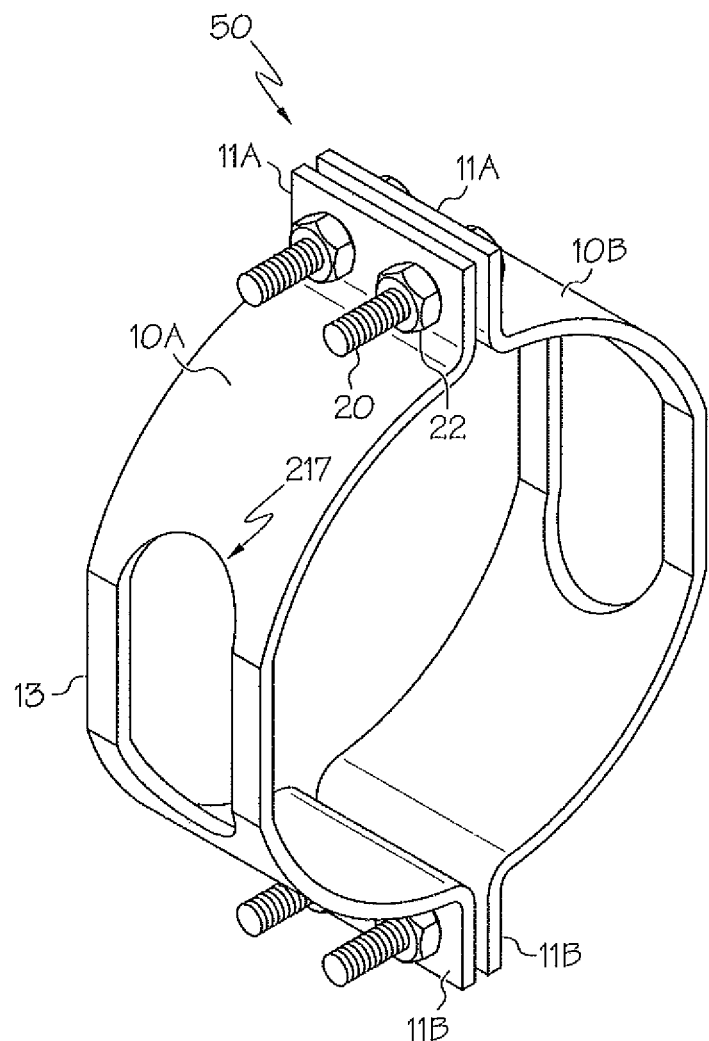
FIG. 10 is a perspective view of an alternative embodiment of a clamp in accordance with the present inventive concepts.

In other embodiments, for example as shown in the embodiment of FIG. 10, the window region 217 can be configured as a flat, or straight region relative to the curvature of the body portion.

In the illustration of FIG. 8, the pipe coupling 100 being repaired is a coupling that joins first pipe 114A of a first, narrower, diameter with second pipe 114B of a second, larger, diameter. Accordingly the pipe coupling 100 under repair further secures a pipe end cap 114C in the form of a fitting that allows for a transition is pipe size between the first pipe 114A and the second pipe 114B. Embodiments of the present inventive concepts are applicable to servicing of pipe couplings that join any of a number of different sizes and configurations of pipes and apparatus.

While embodiments are depicted herein as including two clamp units 10A, 10B that interface at flanges 11A, 11B, embodiments that have more than two clamp units, for example, three, four, or more, clamp units, are equally applicable to the principles of the present inventive concepts.

Figure 11:
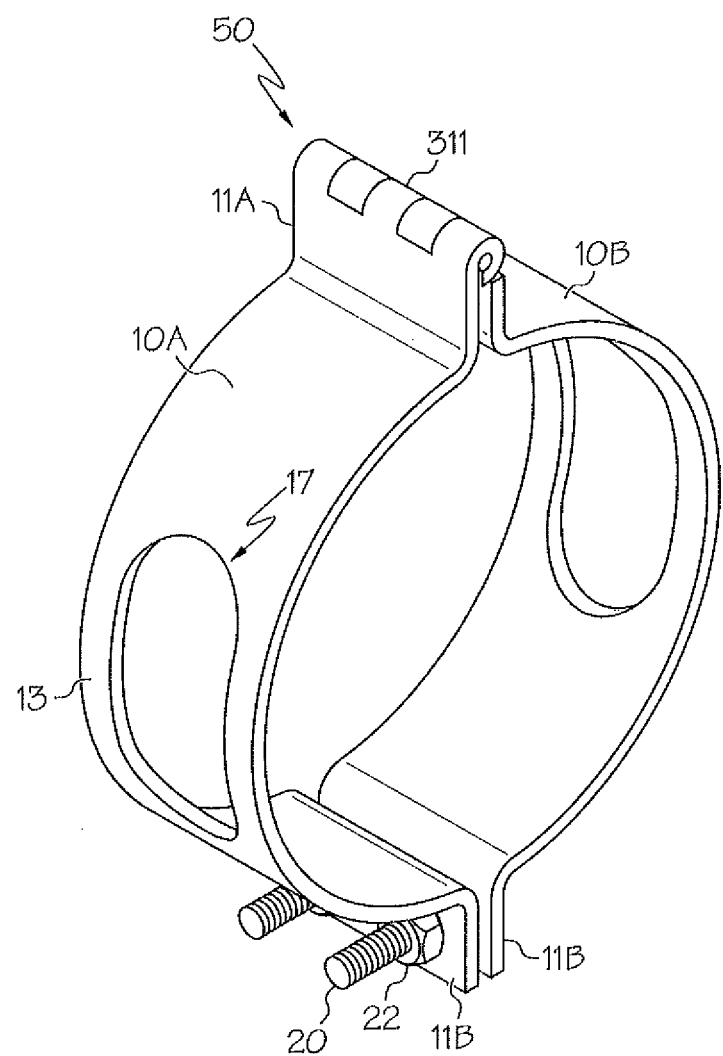
FIG. 11 is a perspective view of an alternative embodiment of a clamp in accordance with the present inventive concepts.

In addition, while embodiments are depicted herein as including two clamp units 10A, 10B that interface at two sets of flanges 11A, 11B, embodiments that have only a single flange 11A, 11B interface are equally applicable to the principles of the present inventive concepts. For example, one the flanges 11A, 11B can be replaced by a hinge or fold that allows for pivot of the two clamp units 10A, 10B relative to each other and about the pipe coupling to be repaired. For example, in the embodiment of FIG. 11, one of the flanges is replaced by a hinge 311 that pivotably couples the first and second clamp units 10A, 10B. In such an embodiment, the hinge 311 is constructed and arranged to open the clamp units 10A, 10B to a sufficient degree to receive the pipe coupling to be repaired, and is of sufficient strength to support the clamp 50 while the coupling 100 undergoes repair.

Figure 12:
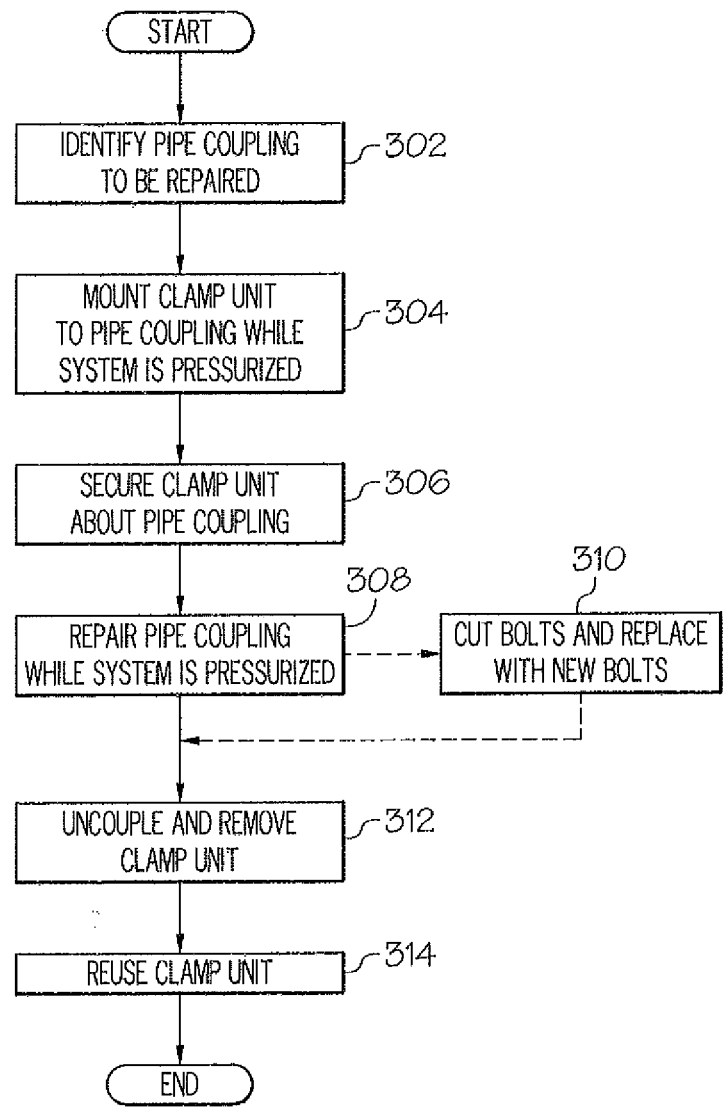
FIG. 12 is a flow diagram of a method of repairing a pipe coupling, in accordance with the present inventive concepts.

FIG. 12 is a flow diagram of a method of repairing a pipe coupling, in accordance with the present inventive concepts. In some embodiments, a method for repair of a pipe coupling can include identifying the pipe coupling to be repaired 302. A clamp unit is mounted about the pipe coupling, which pipe coupling is attached to a system that is pressurized 304. The clamp unit is secured about the pipe coupling 306 so that the inner surface of the clamp unit engages the pipe coupling to be repaired. As described herein, the pipe coupling can be repaired while the underlying system is "live" or pressurized 308. In some embodiments, such repair can comprise cutting the existing bolts and replacing them with new bolts, while the system is pressurized 310. Following the repair, the clamp unit can be uncoupled and removed from the pipe coupling 312. The clamp unit can be optionally re-used for repair of another pipe coupling 314. In various embodiments, for purposes of the present disclosure, the term "pressurized system" may include pipes and related fittings and pipe couplings through which a pressurized fluid flows.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A clamp for repairing a pipe coupling at a joint between a first pipe section and a second pipe section through which fluid flows during the repair, the pipe coupling at the joint having a first flange and a second flange, the clamp comprising:
 a first clamp unit positioned about the joint between the first pipe section and the second pipe section, the first clamp unit comprising:
  a first end, the first end comprising:
   a first flange; and
   a first flange hole extending through the first flange;
  a second end, the second end comprising;
   a second flange; and
   a second flange hole extending through the second flange;
  a first body portion extending between the first end and the second end; and
  one and only one first window in the first body portion having a region equidistant between the first flange and the second flange and having a first width extending in a circumferential direction of the first body portion and a second width perpendicular to, and less than, the first width for receiving and exposing the first flange of the pipe coupling extending from an interior of the first clamp unit through the first window;
 a second clamp unit removably coupled to the first clamp unit about the joint between the first pipe section and the second pipe section, the second clamp unit comprising:
  a first end, the first end comprising:
   a third flange; and
   a third flange hole extending through the third flange, and aligned with the first flange hole of the first clamp unit;
  a second end, the second end comprising;
   a fourth flange; and
   a fourth flange hole extending through the fourth flange, and aligned with the second flange hole of the first clamp unit;
  a second body portion extending between the first end and the second end; and
  one and only one second window in the second body portion having a region equidistant between the third flange and the fourth flange and having a first width extending in a circumferential direction of the second body portion and a second width perpendicular to, and less than, the first width for exposing the second flange of the pipe coupling extending from an interior of the first clamp unit through the second window, wherein the pipe coupling about which the clamp is positioned has an outer surface having an outer diameter that is greater than an outer diameter of the first and second pipe sections, and wherein the first clamp unit and the second clamp unit have an inner surface of an inner diameter dimensioned for positioning about the pipe coupling so that the inner surfaces of the first and second clamp units directly abut the pipe coupling surface having the outer diameter; and
 a coupling constructed and arranged to extend through at least one of the aligned first and third flange holes or the aligned second and fourth flange holes for securing each of the pipe coupling first flange at the first window and the pipe coupling second flange at the second window.

2. The clamp of claim 1, wherein the coupling includes a bolt that extends through the at least one of the aligned first and third flange holes or the aligned second and fourth flange holes and a threaded nut in communication with the bolt.

3. The clamp of claim 2, wherein a force created by the threaded nut about the bolt causes the first ends of the first and second clamp units, respectively, to move axially toward each other, which in turn causes the first and second clamp units to tighten around the pipe coupling.

4. The clamp of claim 1, wherein the body portion of each of the first and second clamp units has an arc shape so that a combination of the first and second clamp units coupled to each other is ring shaped.

5. The clamp of claim 1, wherein the first and second clamp units apply a force directly on the pipe coupling that counteracts a force caused by fluid pressure at the pipe sections.

6. The clamp of claim 1, wherein the first and second clamp unit flanges at the first ends of the first and second clamp units are coupled together at a first position of the clamp, wherein the first and second clamp unit flanges at the second ends of the first and second clamp units are coupled together at a second position of the clamp opposite the first position, and wherein the first window of the first clamp unit is at a third position between the first and second positions, and the second window of the second clamp unit is at a fourth position opposite the third position, and between the first and second positions.

7. The clamp of claim 1, wherein the flanges are oriented normal to a curvature of the first and second clamp units, respectively, so as to face each other.

8. The clamp of claim 1, wherein at least one of the first or second clamp units includes an indentation about at least one of the first or second window.

9. The clamp of claim 1, wherein the first or second window includes an area for repair between the first and second width, at which a replacement of a bolt of the pipe coupling is performed, the bolt extending from the area for repair of the first or second window.

10. A clamp for repairing a pipe coupling at a joint between a first pipe section and a second pipe section through which fluid flows during the repair, the pipe coupling having a first flange and a second flange, the clamp comprising:
 a first plate for positioning on one side of the pipe coupling and the first and second pipe sections;
 a second plate separate from the first plate when positioned on an opposite side of the pipe coupling and the first and second pipe sections as the first plate and the first and second pipe sections, respectively;
 the first plate and the second plate having outermost edge surfaces that are separate from each other by a distance at least a width of the pipe coupling;
 a window at a working region of separation between the first plate and the second plate for exposing and accessing the first and second flanges of the pipe coupling;
 a first coupler holder having a surface that is perpendicular to a surface of the first plate, and extending from an outermost surface of the first plate in a direction toward the second plate and abutting each of the first and second pipe sections;

a second coupler holder having a surface that is perpendicular to a surface of the second plate, and extending from an outermost surface of the second plate in a direction toward the first plate, and abutting each of the first and second pipe sections, wherein the pipe coupling has an outer surface having an outer diameter that is greater than an outer diameter of the first and second pipe sections, and wherein the first coupler holder and the second coupler holder have an inner surface of an inner diameter dimensioned for positioning on about the pipe coupling so that the inner surfaces of the first coupler holder and the second coupler holder directly abut the pipe coupling surface having the outer diameter; and at least four bolts extending between the first and second plates in a direction of extension that is perpendicular to the direction of the extension of the first and second pipe sections.

11. The clamp of claim 10, wherein the first and second coupler holders are each constructed and arranged for conforming with a surface of the first and second pipe sections.

12. The clamp of claim 10, wherein a bolt of the at least four bolts extends through holes in the first plate and holes in the second plate aligned with the holes in the first plate, and wherein the clamp further includes a threaded nut for each bolt, wherein the bolts and nuts provide a force that moves the first and second plates toward each other and toward the pipe coupling so that the first plate directly abuts, and applies a force to, the first side of the pipe coupling and so that the second plate directly abuts, and applies a force to, the second of the pipe coupling.

13. The clamp of claim 12, wherein a force created by the threaded nut about the bolt causes the first and second plates to tighten around the pipe coupling and for the first and second coupler holders to tighten about the first and second pipe sections.

14. The clamp of claim 10, wherein the first and second plates apply a force directly on the pipe coupling that counteracts a force caused by fluid pressure at the first and second pipe sections.

15. A clamp for repair of a pipe coupling at a joint between a first pipe section and a second pipe section through which fluid flows during the repair, the pipe coupling having a first flange and a second flange, comprising:

a clamp unit positioned about the joint between the first pipe section and the second pipe section, the clamp unit including a side wall with an inner surface, the inner surface having a curvature dimensioned to match an outer curvature of a pipe coupling to be repaired;

a coupling on the clamp unit constructed and arranged to couple a first portion of the clamp unit with a second portion of the clamp unit wherein the coupling, when secured, operates to induce a radially inward force on the inner surface of the clamp unit;

a window comprising an opening in the side wall of the clamp unit, the opening equidistant between the first flange and the second flange, the window dimensioned to expose a flange of a pipe coupling to be repaired that protrudes through the window, wherein the pipe coupling has a surface having an outer diameter that is greater than an outer diameter of the first and second pipe sections and the pipe coupling, and wherein the curvature of the inner surface of the side wall of the clamp unit is dimensioned for positioning about the pipe coupling between the first and second pipe sections so that the inner surface directly abuts the pipe coupling surface having the outer diameter.

16. The clamp of claim 15 wherein portions of the inner surface of the side wall are substantially cylindrical.

17. The clamp of claim 16 wherein the coupling comprises at least one flange outwardly extending from the cylindrical side wall in a direction normal to the inner surface.

18. The clamp of claim 17 wherein the at least one flange comprises an opening constructed and arranged to receive a bolt and wherein the coupling comprises a mating nut and bolt.

19. The clamp of claim 18 wherein the bolt, when coupling the clamp unit is positioned in a direction tangential to the cylindrical side wall and perpendicular to, and offset from, a center axis of the cylindrical side wall.

20. The clamp of claim 17 wherein the at least one flange comprises first and second opposed flanges and wherein the clamp unit comprises first and second side wall portions.

21. The clamp of claim 15 wherein a radius of curvature of the portions of the inner surface of the side wall are same as that of the inner surface of the window.

22. The clamp of claim 15 wherein a radius of curvature of the portions of the inner surface of the side wall are different that of the inner surface of the window.

23. The clamp of claim 22 wherein the inner surface of the side wall in a region of the window is flat.

24. The clamp of claim 22 wherein the inner surface of the side wall in a region of the window is indented.

25. The clamp of claim 15 wherein the radially inward force induced by the coupling is sufficient to secure a pipe coupling to be repaired during its repair.

* * * * *

UNITED STATES PATENT AND TRADEMARK OFFICE
CERTIFICATE OF CORRECTION

| | |
|---|---|
| PATENT NO. | : 9,739,410 B2 |
| APPLICATION NO. | : 14/795381 |
| DATED | : August 22, 2017 |
| INVENTOR(S) | : Stephen J. Skinner |

It is certified that error appears in the above-identified patent and that said Letters Patent is hereby corrected as shown below:

Column 14, Line 37, Claim 21, Please insert the word -- the -- after "of the portions of the inner surface of the side wall are" and before "same as that of the inner surface of the window"

Column 14, Line 42, Claim 22, Please insert the word -- than -- after "different" and before the word "that"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*